United States Patent
Hartnett et al.

(10) Patent No.: US 8,061,578 B2
(45) Date of Patent: Nov. 22, 2011

(54) SOLDER PREFORM

(75) Inventors: Amanda M. Hartnett, Utica, NY (US);
Paul Socha, Whitesboro, NY (US)

(73) Assignee: Indium Corporation, Clinton, NY (US)

( * ) Notice: Subject to any disclaimer, the term of this patent is extended or adjusted under 35 U.S.C. 154(b) by 0 days.

(21) Appl. No.: 12/699,740

(22) Filed: Feb. 3, 2010

(65) Prior Publication Data

US 2011/0186617 A1 Aug. 4, 2011

(51) Int. Cl.
*B23K 35/14* (2006.01)
*B23K 31/02* (2006.01)

(52) U.S. Cl. ........................ 228/56.3; 228/246
(58) Field of Classification Search .................. None
See application file for complete search history.

(56) References Cited

U.S. PATENT DOCUMENTS

| | | | | |
|---|---|---|---|---|
| 1,399,769 A | * | 12/1921 | Hodgkinson | 428/572 |
| 2,445,858 A | * | 7/1948 | Mitchell et al. | 428/675 |
| 2,664,844 A | * | 1/1954 | Siegrist et al. | 228/56.3 |
| 3,221,970 A | * | 12/1965 | Lockshin | 228/56.3 |
| 3,439,859 A | * | 4/1969 | Filson | 228/56.3 |
| 3,458,923 A | * | 8/1969 | Hoffman | 228/199 |
| 3,491,934 A | * | 1/1970 | Foote | 228/56.3 |
| 3,750,265 A | * | 8/1973 | Cushman | 228/180.21 |
| 3,899,074 A | * | 8/1975 | Lucas | 206/343 |
| 4,899,615 A | * | 2/1990 | Matt | 74/567 |
| 5,242,097 A | * | 9/1993 | Socha | 228/56.3 |
| 5,366,140 A | * | 11/1994 | Koskenmaki et al. | 228/246 |
| 5,620,129 A | * | 4/1997 | Rogren | 228/56.3 |
| 5,820,014 A | * | 10/1998 | Dozier et al. | 228/56.3 |
| 5,842,274 A | * | 12/1998 | Modl et al. | 29/840 |
| 5,957,364 A | * | 9/1999 | Socha | 228/56.3 |
| 6,012,626 A | * | 1/2000 | Antao | 228/254 |
| 6,139,972 A | * | 10/2000 | Trott et al. | 428/458 |
| 6,347,901 B1 | * | 2/2002 | Park et al. | 403/270 |
| 6,793,116 B2 | * | 9/2004 | Harada | 228/56.3 |
| 7,651,938 B2 | | 1/2010 | Too et al. | |
| 2007/0284737 A1 | * | 12/2007 | Too et al. | 257/737 |
| 2010/0117222 A1 | | 5/2010 | Too et al. | |

* cited by examiner

*Primary Examiner* — Kiley Stoner
(74) *Attorney, Agent, or Firm* — Sheppard Mullin Richter & Hampton LLP

(57) ABSTRACT

A solder preform has gaps extending from the boundary of preform towards the preform center. During reflow soldering, the gaps close from the center towards the boundary. This allows flux and gasses to escape the interface between the solder and the substrate. Particularly, flux accumulates in the spaces formed by the gaps and is forced to the edge of the solder preform as the gap closes. In further embodiments, channels are formed on one or both surfaces of the solder preform. In addition to further assisting in the escape of gas and flux during reflow, the channels and gaps increase the effectiveness of oxygen purging using inert or reducing gasses in the reflow chamber. Additionally, the channels and gaps increase the effectiveness of vacuum solder.

10 Claims, 6 Drawing Sheets

SOLDER PREFORM

TECHNICAL FIELD

The present invention relates generally to solder preforms, and more particularly, some embodiments are related to solder preform design.

DESCRIPTION OF THE RELATED ART

Many electronic high frequency or high power devices have been developed that generate substantial amounts of heat during operation due to uncaptured energy generated as a byproduct of general operation. In order to prolong the integrity of these devices, the heat must be dissipated away from the device. Metal solders are frequently used for mechanical bonding and heat dissipation through an interface between a heat source and cooling mechanism. In this role, the solder performs an integral function in controlling the operating temperature of the device. Furthermore, in large area interconnections using solder materials, voiding may influence electrical power continuity or mechanical robustness.

The thermal resistance through a thermal interface, including one made with solder, is often the most critical characteristic used to gauge the integrity of the interconnect because it directly impacts the reliability of the entire device. High thermal resistance through the solder interface causes a heat dissipation bottleneck to the subsequent cooling material stack. Variations in the thermal resistance of solder interconnects are caused primarily by voiding in the solder interface because air has a higher thermal resistance than metal.

A process for manufacturing a thermally and electrically conductive solder preform begins by casting a solder alloy ingot and then fowling it into a ribbon. The ribbon is then rolled down to a precise thickness. After that, the ribbon is cut to shape with precise two-dimensional X-Y control. The resulting preform is placed onto the surface of a heat-generating device and, in some applications, a flux is applied. Finally, a cooling mechanism or top, which may include a lid, back plate, heat sink, etc. is placed on the preform and reflow is performed. However, it is very difficult and sometimes impossible to realize a conductive solder interfacial layer with minimal voiding.

Most solder voiding is caused by gases trapped during the reflow process. During solder reflow, atoms of the solder are attracted to the base metal atoms and these bond together and form intermetallics. As this bonding occurs, the air that was initially present between the solder surface and base metal must evacuate. If this does not occur before the solder re-solidifies, the air will become trapped and form a void.

Exposed solder metal surfaces react with the oxygen in the air to form metal oxides. Unless they are removed, these metal oxides inhibit solder atoms from interacting with the base metal. The most common method for removing metal oxides is to use a flux. Ideally, the flux removes the oxide film and takes it into the main flux body. Then, the flux is displaced by molten solder and pushed to the perimeter as the solder reacts with the base metal.

In many circumstances, the flux or air does not reach the perimeter of solder spread before the reflow process is complete and these materials become trapped, creating areas of high thermal and electrical resistance within the solder interface. The thermal conductivity of air is approximately 0.025 W/mK while with the thermal conductivity of Sn63Pb37 solder is 50 W/mK. Accordingly, this solder is able to effectively conduct the heat and electricity through the interface to the subsequent metal layer while air voids will hold the heat and charge significantly longer, trapping thermal and electrical energy and raising the junction temperature of the device.

In cases where fluxing action is created by vacuum soldering or inert reducing gases, entrapped metal oxides or air in or surrounding the preform also causes voiding.

BRIEF SUMMARY OF EMBODIMENTS OF THE INVENTION

According to various embodiments of the invention, A solder preform has gaps extending from the boundary of the preform towards the preform center. During reflow soldering, the gaps close from the center towards the boundary. This allows flux and gasses to escape the interface between the solder and the substrate. Particularly, flux accumulates in the spaces formed by the gaps and is forced to the edge of the solder preform as the gap closes. In further embodiments, channels are formed on one or both surfaces of the solder preform. In addition to further assisting in the escape of gas and flux during reflow, the channels increase the effectiveness of oxygen purging using inert or reducing gasses in the reflow chamber. The channels also increase the effectiveness of vacuum soldering by increasing the preform's surface area. This creates shorter paths for embedded oxides to be pulled out from the solder area to the external surface.

According to an embodiment of the invention, a solder preform, comprises a solder material occupying a portion of an area defined by at least one boundary and having a plurality of gaps; and a plurality of channels formed on a surface of the bounded area; wherein the solder preform has a perimeter defined by the at least one boundary and the plurality of gaps; wherein a gap of the plurality of gaps extends from a location within the bounded area to the boundary and has a shape configured such that the gap closes in a direction from the location within the bounded area to boundary during reflow soldering; and wherein a channel of the plurality of gaps is shaped to create a space between the solder preform and a bonding substrate such that gas can flow from the boundary to the space.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
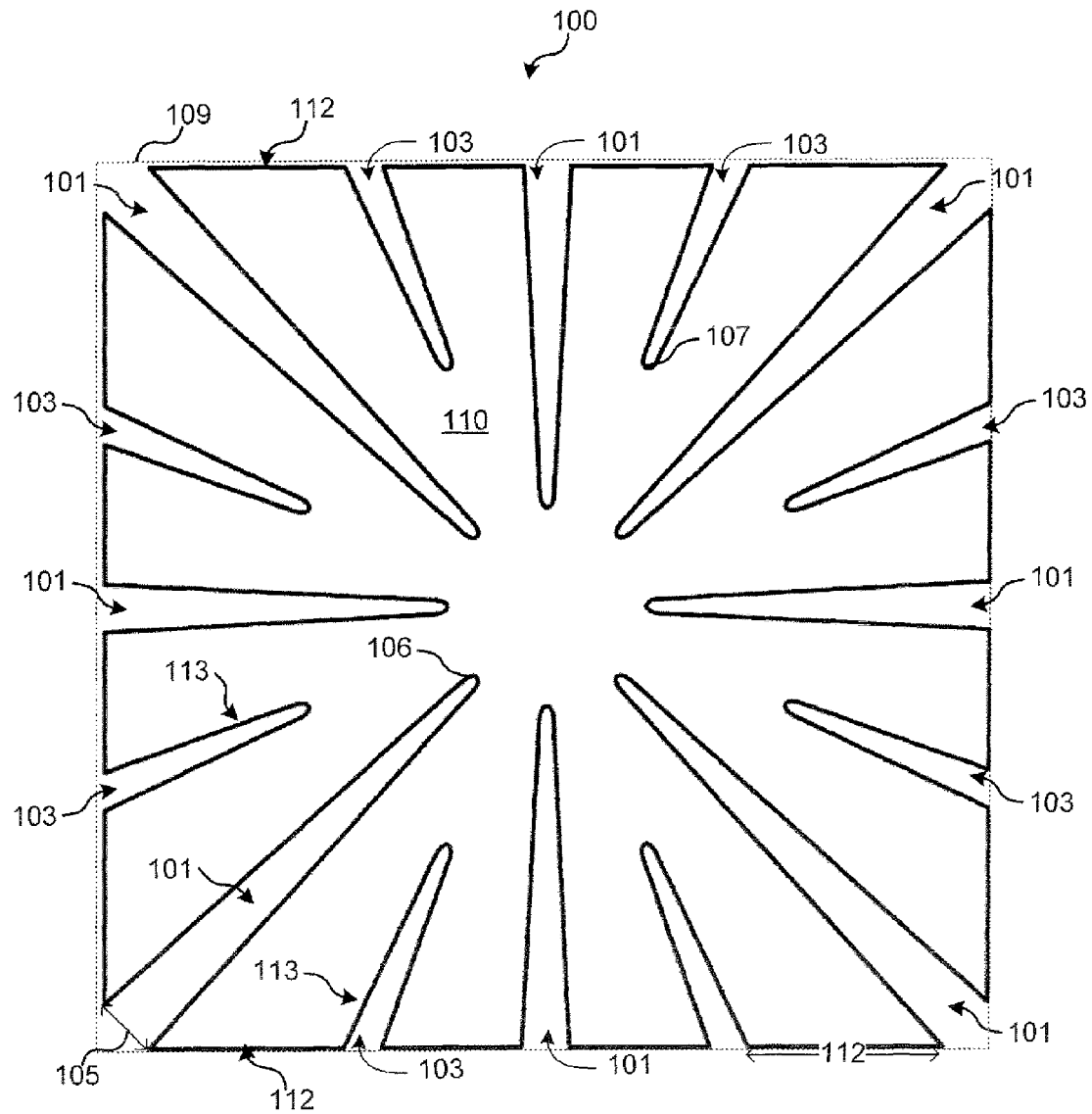
FIG. 1 illustrates a solder preform according to an embodiment of the invention.

Embodiments of the present invention are directed toward a solder preform shaped to form a solder bond having reduced voiding characteristics. FIG. 1 illustrates one such solder preform according to an embodiment of the invention. Solder preform 100 comprises a thin sheet soldering material having predetermined dimensions, typically cut from a solder ribbon. Solder preform 100 may be composed of virtually any solder alloy, such as SnPb, SnSb, AuSn, AuGe, In, InPb, InAg, InSn, BiSn, SnAg, PbSnAg, PbInAg, or SnAgCu. Additionally, the solder preform 100 may be a clad solder preform comprising a foil or mesh layer of a high melting temperature metal such as Cu, Ni, or Al, clad with a solder alloy coating on one or both sides of the high melting temperature layer. Solder preform 100 may further comprise a flux material, either internally as a core or layer, or externally as a coating. In other embodiments, flux materials might be added at other stages during the soldering process.

The solder preform 100 is bounded by boundary 109, with the material of the preform occupying a portion 110 of the area defined by the boundary. The portion 110 of the area is further defined by the locations of one or gaps 101 or 103 that comprise areas lacking solder material. These gaps 101 and 103 extend from locations within the bounded area to the boundary 109. Accordingly, the perimeter of the solder preform 100 is defined by edge portions 112 of the preform that border the boundary 109 and edge portions 113 that border the gaps 101 and 103. As illustrated in FIGS. 5-8, differently shaped solder preforms may be bounded by corresponding boundaries 109 and differently oriented gaps 101. Additionally, some solder preforms may have multiple boundaries, such as the washer-shaped solder preforms illustrated in FIGS. 6 and 8 with boundaries 109 and 111. In some embodiments, the boundary (or boundaries) 109 are determined according the solder preform application. For example, the shape of the boundary 109 may be determined by the dimensions of the joint to be soldered For instance, the solder preform illustrated in FIG. 1 has a square boundary 109, and would therefore be suitable for applications with square solder joints.

In the illustrated embodiment, a plurality of gaps 101 extend from locations 106 within the bounded area to the boundary 109. In this embodiment, the plurality of gaps 101 has a subset of gaps 103 that are shorter than the rest of the gaps. In some embodiments these distances may be configured such that sufficient solder surface area is present over the entire solder preform for proper bonding, or the distances may be configured to provide sufficient strength to the solder preforms for transport and application.

In further embodiments, the gap starting locations 106 may be located at various other positions. For instance, in the illustrated embodiment, the end locations of the first set of gaps 101 occur at the corners and at the midpoints of the boundary, while the end locations of the subset of gaps 103 are located at the boundary portions between the first set's endpoints. However, in other embodiments, there may be sufficient space to have additional sets of gaps having correspondingly decreasing lengths.

Figure 7:
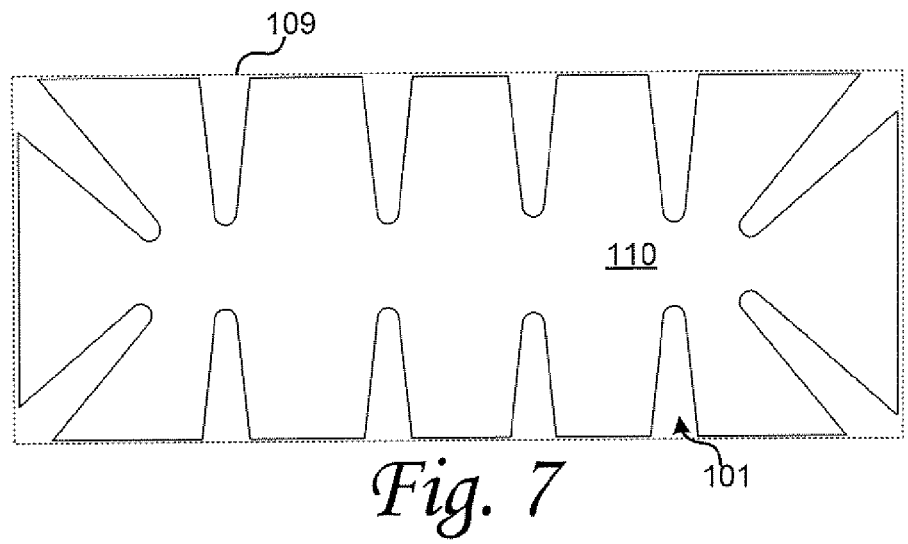
FIG. 7 illustrates a fifth solder preform according to an embodiment of the invention.
Figure 8:
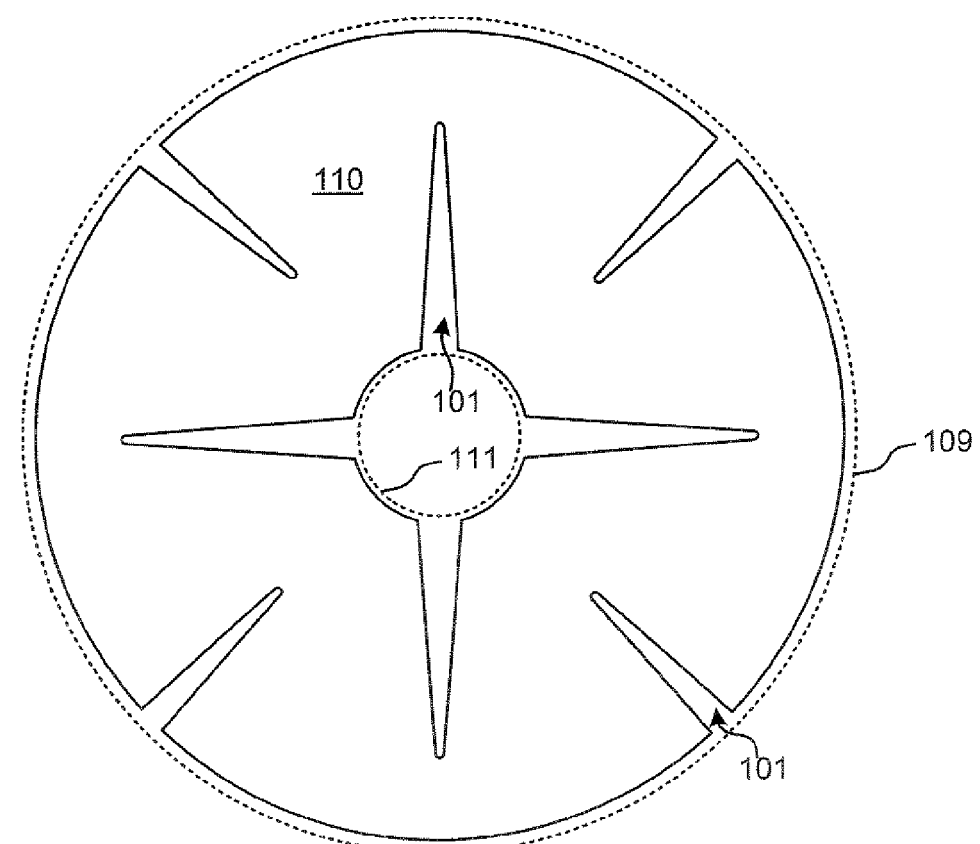
FIG. 8 illustrates a sixth solder preform according to an embodiment of the invention.

In still further embodiments, the gaps may be located in other configurations. For example, rather than extending radially from the preform center, the gaps may extend in other directions or from other locations. For instance, in the washer-shaped preform illustrated in FIG. 8, some of the gaps 101 extend from the interior region 110 to the inner boundary 111 while other gaps 101 extend from the interior region 110 to the outer boundary 109. As another example, in a rectangular preform, gaps on the longer edges of the preform might extend in directions extending off of a center line of the rectangle, as illustrated by FIG. 7.

In additional embodiments, some or all of the gaps are substantially wedge shaped such that their width 105 increases towards the boundary. As described below, this configuration may help during reflow for the gaps to close from the starting location towards their ends, thereby forcing evacuated flux towards the preform's periphery. In other embodiments, different gap contours may be employed.

Figure 2:
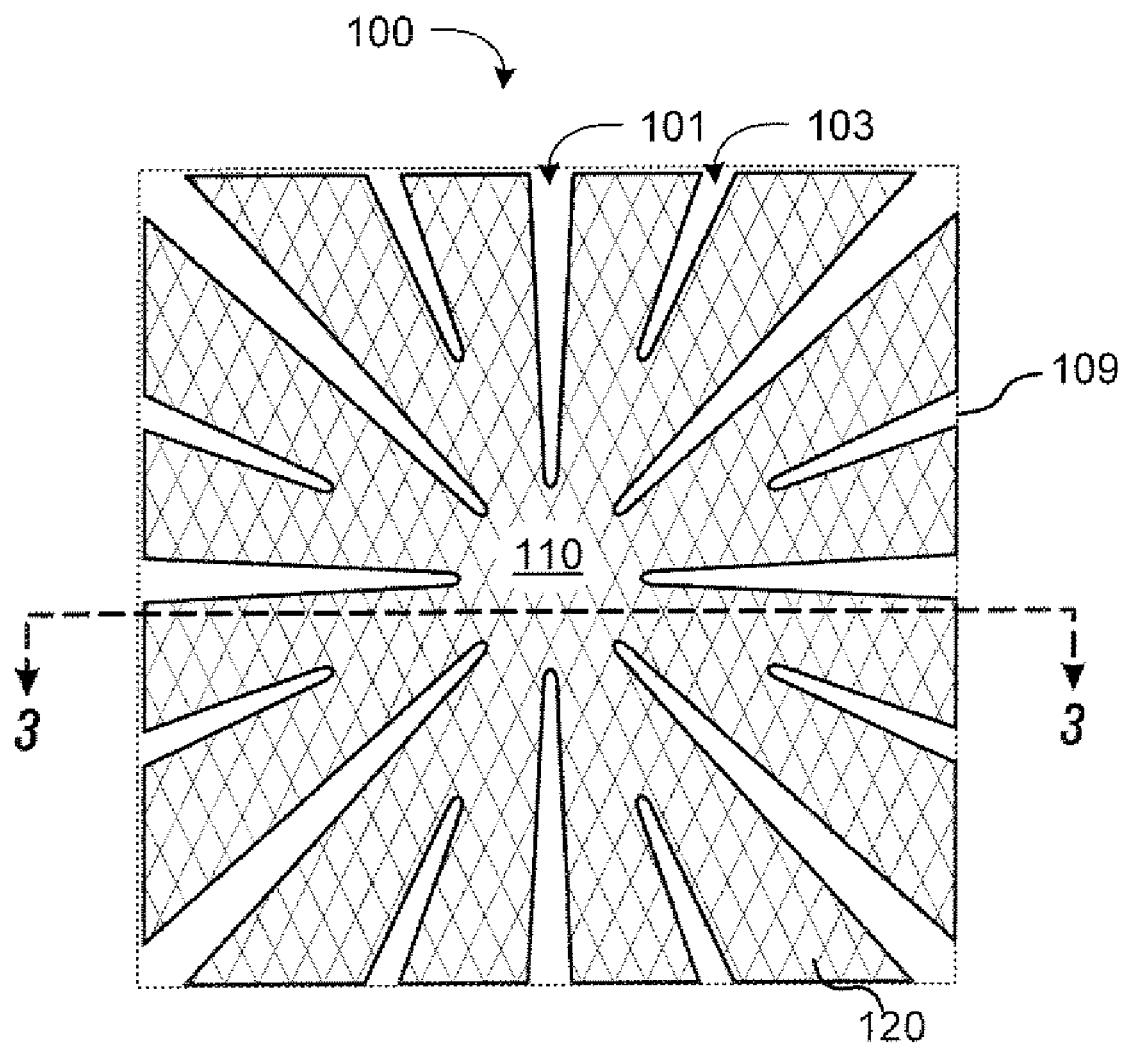
FIG. 2 illustrates a second solder preform according to an embodiment of the invention.
Figure 3:
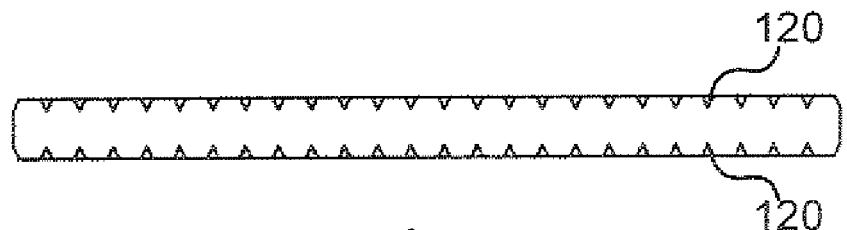
FIG. 3 illustrates the embodiment of FIG. 2 in a cross-sectional view.

In addition to gaps 101, some embodiments employ a plurality of channels 120 formed on the one or both faces of the solder preform. FIGS. 2 and 3 illustrate these channels from a top-down perspective and a cross section. Channels 120 may be configured to cover the surface of the solder preform in crosshatch or other type of pattern, such as a rectilinear grid pattern, or a non-crossing series of lines, for example. In addition to further assisting in flux evacuation during reflow, these channels may help provide increased surface area for flux operation and may assist in oxygen gas purging in reflow chambers or metal oxide reduction in vacuum chambers. The gaps increase both the surface area of the preform and the exposure of the substrates to which the preform bonds. This increase in surface area and exposure allows the flux improved access to the substrate and solder preform.

Some reflow soldering chambers can be purged of oxygen using inert or reducing gases such as nitrogen, argon, hydrogen, or forming gas. However, with standard solder preforms, some oxygen can be trapped between the preform and the substrate and so remain even after purging. In the illustrated embodiment, channels 120 reduce or prevent the formation of trapped oxygen pockets, increasing the effectiveness of oxygen purging. Additionally, when a reducing gas is used, the channels 120 allow the reducing gases to react throughout the solder preform to eliminate metal oxides which could lead to voids.

Figure 4:
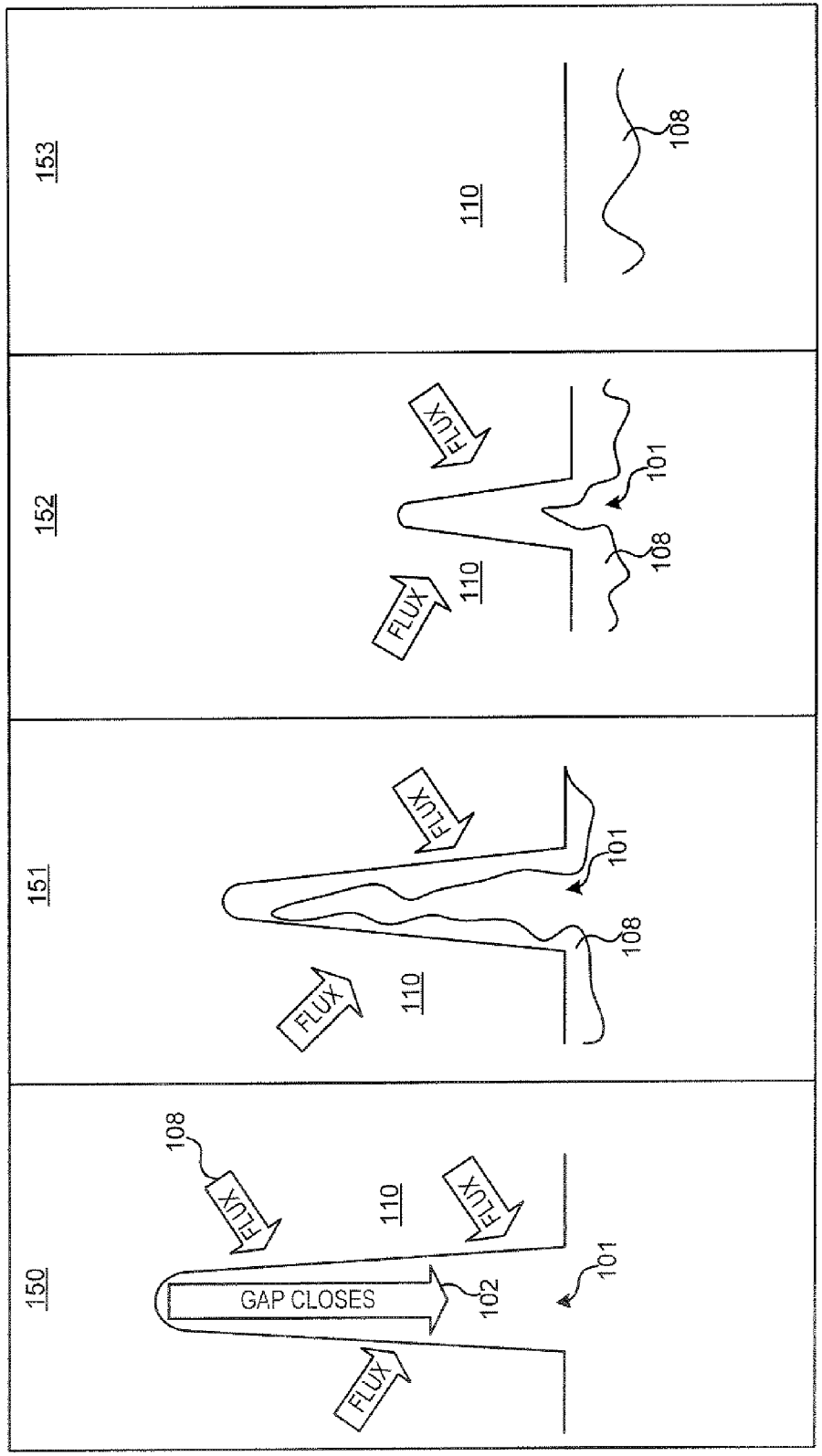
FIG. 4 illustrates a soldering process according to an embodiment of the invention.
Figure 5:
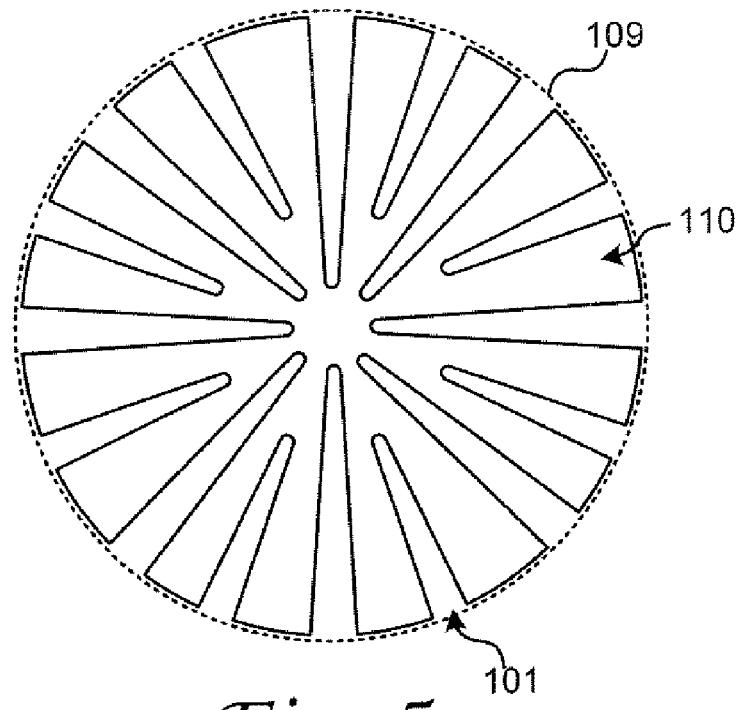
FIG. 5 illustrates a third solder preform according to an embodiment of the invention.
Figure 6:
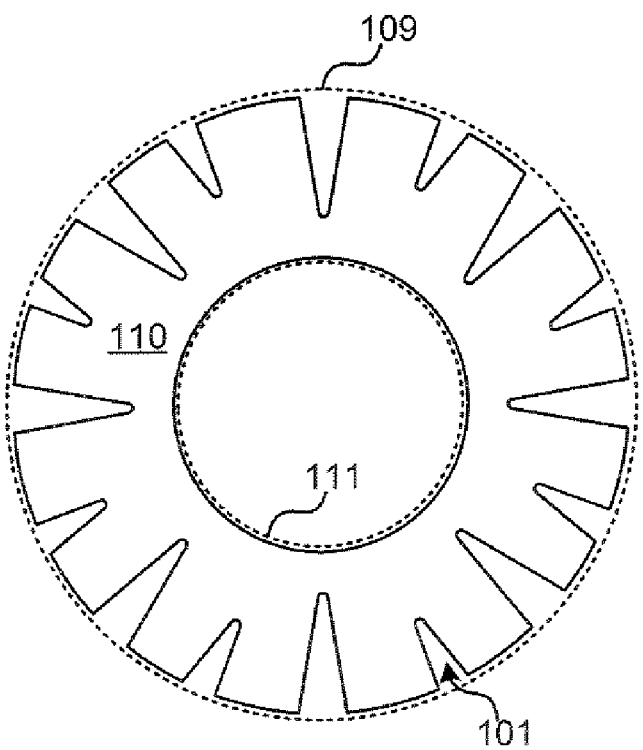
FIG. 6 illustrates a fourth solder preform according to an embodiment of the invention.

FIG. 4 is illustrative of how gaps in the solder preform assist in the outgassing of chemical flux in one embodiment of the invention. In a standard soldering process, flux is applied to the interior or exterior of the preform 100 and the preform 100 is applied to the bonding substrates. Heat is applied to activate the flux 108 and melt the solder preform 100. As the flux reduces or removes metal oxides from the solder preform 100 and bonding substrates, the solder 100 begins to react with the bonding substrates fixating intermetallics. As panels 150-153 illustrate, as the solder 100 wets to the substrates, the flux 108 which was present is expelled and travels down the preform gaps to the outermost perimeter of the preform, with the solder closing 102 the gap behind it. Because of the proximately of the gap 101, flux 108 that is expelled during wetting has less distance to travel than if the gap were not present. Accordingly, the gaps in the solder preform provide a natural release of exhausted flux 108 that might otherwise have become trapped underneath or within the preform 100.

Figure 9:
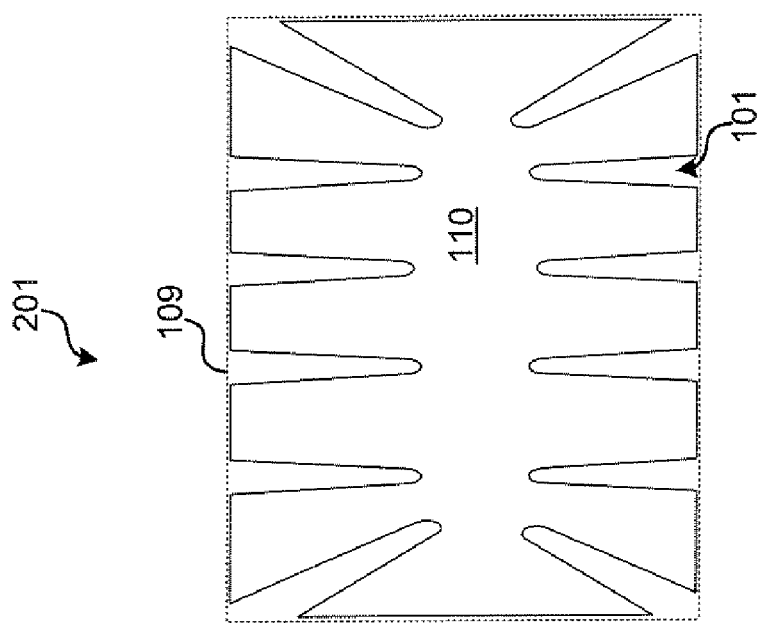
FIG. 9 illustrates a first solder preform designed for a fast spreading solder and a second solder preform designed for a slow spreading solder.
Figure 9:
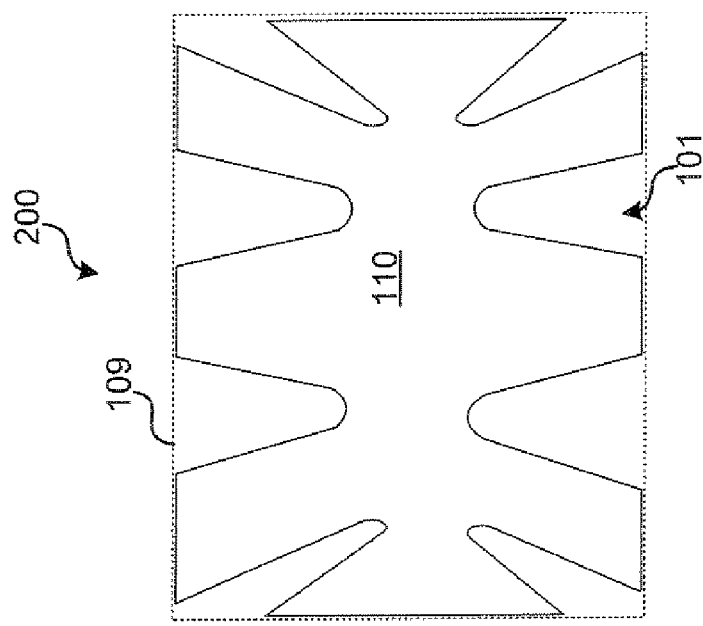

FIGS. 5-8 illustrate other types of solder preform shapes according to various embodiments of the invention. Solder preforms are available in a large variety of shapes and can be configured to meet almost any solder joint need. In various embodiments, gaps 101 or channels can be incorporated into these various shapes and configurations. Although illustrated with a single length of gap 101, solder preforms of various shapes may have multiple gap lengths, as described with respect to FIG. 1. In typical embodiments, the gaps 101 are placed in a symmetrical or regular manner around the solder preform. In addition to placing the gaps or channels according the physical dimensions of the solder preform, the placements and physical dimensions of the gaps and channels may vary according various soldering parameters, such as wettability or rate of spread of the solder alloy on a given substrate material, reflow processes, and fluxing techniques. For example, SnPb on a gold substrate spreads quickly over a large distance. In some embodiments, the gaps may be wider for a solder preform that is fast spreading to prevent the solder from flowing together at the boundary 109 before the gaps 101 have closed. Additionally, in a fast spreading solder, there may be fewer gaps as compared to a slow spreading solder. FIG. 9 illustrates these differences, where solder preform 200 is a solder preform shape with gaps 101 configured for a fast spreading solder, while solder preform 201 is a solder preform shape with a larger number of thinner gaps 101 configured for a slow spreading solder.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A solder preform, comprising:
a solder material occupying a portion of an area defined by a first boundary and a second boundary and having a plurality of gaps;
wherein the solder preform has a perimeter defined by the first boundary and the plurality of gaps;
wherein a first gap of the plurality extends from a location within the bounded area to the first boundary;
wherein the first gap is shaped such that the first gap closes from the location within the bounded area to the first boundary as the solder preform melts during a soldering procedure;
wherein a second gap of the plurality extends from a second location of the bounded area to the second boundary; and
wherein the solder preform perimeter is shaped such that the solder preform forms a single volume of solder during the soldering procedure.

2. The solder preform of claim 1, further comprising a plurality of channels formed on a surface of the solder material.

3. The solder preform of claim 2, further comprising a second plurality of channels formed on a second surface of the solder material.

4. The solder preform of claim 2, wherein the channels are shaped to create a space between the solder preform and a bonding substrate such that gas can flow from the first boundary to the space.

5. The solder preform of claim 1, wherein the first gap has a width that increases from the location within the bounded area to the first boundary.

6. The solder preform of claim 5, wherein the gap is configured such that solder material proximate to the boundary does not flow together before the gap closes as the solder preform melts during the soldering procedure.

7. The solder preform of claim 6, wherein the number of gaps of the plurality of gaps is configured to provide a predetermined rate of spread of the solder material on a predetermined substrate.

8. The solder preform of claim 1, further comprising a flux disposed inside the bounded area.

9. The solder preform of claim 1, further comprising a flux coating at least a portion of the solder preform.

10. A solder preform, comprising:
a solder material occupying a portion of an area defined by at least a first and a second boundary and having a plurality of gaps; and
a plurality of channels formed on a surface of the bounded area;
wherein the solder preform has a perimeter defined by at least the first and second boundary and the plurality of gaps;
wherein a first gap of the plurality of gaps extends from a location within the bounded area to the first boundary and has a shape configured such that the first gap closes in a direction from the location within the bounded area to the first boundary during reflow soldering;
wherein a channel of the plurality of channels is shaped to create a space between the solder preform and a bonding substrate such that gas can flow from the first boundary to the space;
wherein a second gap of the plurality extends from a second location of the bounded area to the second boundary; and
wherein the solder preform perimeter is shaped such that the solder preform forms a single volume of solder during the soldering procedure.

* * * * *